US012729626B2

(12) United States Patent
Ouyang

(10) Patent No.: US 12,729,626 B2
(45) Date of Patent: Sep. 8, 2026

(54) VANE ASSEMBLY FOR A GAS TURBINE ENGINE SYSTEM

(71) Applicant: Solar Turbines Incorporated, San Diego, CA (US)

(72) Inventor: Xing Ouyang, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 139 days.

(21) Appl. No.: 18/677,970

(22) Filed: May 30, 2024

(65) Prior Publication Data

US 2026/0036053 A1 Feb. 5, 2026

(51) Int. Cl.
*F01D 5/16* (2006.01)
*F01D 9/02* (2006.01)

(52) U.S. Cl.
CPC ................. *F01D 5/16* (2013.01); *F01D 9/02* (2013.01); *F05D 2230/232* (2013.01); *F05D 2240/12* (2013.01); *F05D 2260/96* (2013.01); *F05D 2300/171* (2013.01)

(58) Field of Classification Search
CPC ..... F01D 5/16; F01D 9/02; F01D 9/06; F01D 25/24; F05D 2240/12; F05D 2240/121; F05D 2240/128; F05D 2260/96; F02C 7/04; F02C 7/045; F02C 7/05; F02C 7/055; Y10T 137/0536; F15D 1/04
See application file for complete search history.

(56) References Cited

U.S. PATENT DOCUMENTS

| | | | | |
|---|---|---|---|---|
| 3,187,835 A * | 6/1965 | Smith | B64F 1/26 181/221 |
| 4,019,537 A * | 4/1977 | Bonnard | F01D 25/30 138/37 |
| 6,503,053 B2 | 1/2003 | Huebner | |
| 8,105,038 B2 * | 1/2012 | Ootomo | F01D 5/22 416/194 |
| 9,194,238 B2 | 11/2015 | Roberts, III et al. | |
| 9,429,026 B2 * | 8/2016 | Schreiber | F01D 5/30 |
| 9,885,244 B2 * | 2/2018 | Kray | F04D 29/023 |
| 2022/0098985 A1 | 3/2022 | Chakrabarti et al. | |

FOREIGN PATENT DOCUMENTS

| | | | |
|---|---|---|---|
| FR | 2867506 | 9/2005 | |
| GB | 1332232 A * | 10/1973 | F15D 1/04 |
| JP | 2008303794 | 12/2008 | |

* cited by examiner

*Primary Examiner* — Nathaniel E Wiehe
*Assistant Examiner* — Jason G Davis

(57) ABSTRACT

A vane assembly for directing airflow through an elbow section of an air duct associated with a gas turbine engine includes a plurality of first vanes and at least two second vanes intersecting the plurality of first vanes. Each first vane includes a first plate and a first vibration inhibition device. An upstream end of the first plate is coupled to the first vibration inhibition device. The first plate has a first thickness and the first vibration inhibition device has a first dimension that is greater than the first thickness. Each second vane includes a second plate and a second vibration inhibition device. An upstream end of the second plate is coupled to the second vibration inhibition device. The second plate has a second thickness and the second vibration inhibition device has a second dimension that is greater than the second thickness.

20 Claims, 10 Drawing Sheets

Plane X-X'

VANE ASSEMBLY FOR A GAS TURBINE ENGINE SYSTEM

TECHNICAL FIELD

The present disclosure relates to a vane assembly for a gas turbine engine system, and more particularly, to a vane assembly for directing airflow through an elbow section of an air duct associated with a gas turbine engine.

BACKGROUND

A gas turbine engine generally includes an engine inlet, a compressor, a combustor, turbine rotor assemblies, and an engine outlet. In operation, airflow enters the compressor via the engine inlet, flows through the compressor, the combustor, and the turbine rotor assemblies, and exits the gas turbine engine via the engine outlet, as exhaust gases.

Gas turbine engine systems may include, in addition to a gas turbine engine, air inlet ducts to direct airflow into the gas turbine engine and to prevent debris or foreign materials from entering the gas turbine engine, and/or outlet ducts to direct exhaust gases out of the gas turbine engine. A vane assembly may be disposed within the inlet duct or the outlet duct to direct the airflow around curves in the duct and to reduce pressure losses in the duct. The vane assembly typically includes multiple, fixed vane plates that are arranged in a series of rows and columns.

However, the airflow being directed towards the vane assembly may induce vibrations in the vane assembly, that may lead to damages or failures in the vane plates of the vane assembly. In some cases, the strong airflow may cause disintegration of the vane plates. If one or more vane plates disintegrate, pieces of the broken vane plates may flow into the gas turbine engine and may cause damage to the components of the gas turbine engine. Conventionally, the entire duct needs to be replaced if one or more of the vane plates get damaged, which may increase downtime of the gas turbine engine and may also increase servicing costs of the gas turbine engine.

SUMMARY

In an aspect of the present disclosure, a vane assembly for directing airflow through an elbow section of an air duct associated with a gas turbine engine is provided. The vane assembly includes a plurality of first vanes extending along a longitudinal axis. Each of the plurality of first vanes includes a first plate defining an upstream end and a downstream end, opposite the upstream end. The first plate has a first thickness along a transverse axis that is orthogonal to the longitudinal axis. Each of the plurality of first vanes also includes a first vibration inhibition device. The upstream end of the first plate is coupled to the first vibration inhibition device. The first vibration inhibition device has a first dimension along the transverse axis. The first dimension is greater than the first thickness of the first plate. The vane assembly also includes at least two second vanes extending along the transverse axis, and intersecting the plurality of first vanes. Each of the at least two second vanes includes a second plate defining an upstream end and a downstream end, opposite the upstream end. The second plate has a second thickness along the longitudinal axis. Each of the at least two second vanes also includes a second vibration inhibition device. The upstream end of the second plate is coupled to the second vibration inhibition device. The second vibration inhibition device has a second dimension along the longitudinal axis. The second dimension is greater than the second thickness of the second plate.

In another aspect of the present disclosure, a gas turbine engine system is provided. The gas turbine engine system includes a gas turbine engine. The gas turbine engine includes an engine inlet and an engine exhaust. The gas turbine engine system also includes an air duct coupled to the gas turbine engine. The air duct includes an elbow section. The gas turbine engine system further includes a vane assembly disposed within the elbow section of the air duct for directing airflow through the elbow section. The vane assembly includes a plurality of first vanes extending along a longitudinal axis. Each of the plurality of first vanes includes a first plate defining an upstream end and a downstream end, opposite the upstream end. The first plate has a first thickness along a transverse axis that is orthogonal to the longitudinal axis. Each of the plurality of first vanes also includes a first vibration inhibition device. The upstream end of the first plate is coupled to the first vibration inhibition device. The first vibration inhibition device has a first dimension along the transverse axis. The first dimension is greater than the first thickness of the first plate. The vane assembly also includes at least two second vanes extending along the transverse axis, and intersecting the plurality of first vanes. Each of the at least two second vanes includes a second plate defining an upstream end and a downstream end, opposite the upstream end. The second plate has a second thickness along the longitudinal axis. Each of the at least two second vanes also includes a second vibration inhibition device. The upstream end of the second plate is coupled to the second vibration inhibition device. The second vibration inhibition device has a second dimension along the longitudinal axis. The second dimension is greater than the second thickness of the second plate.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
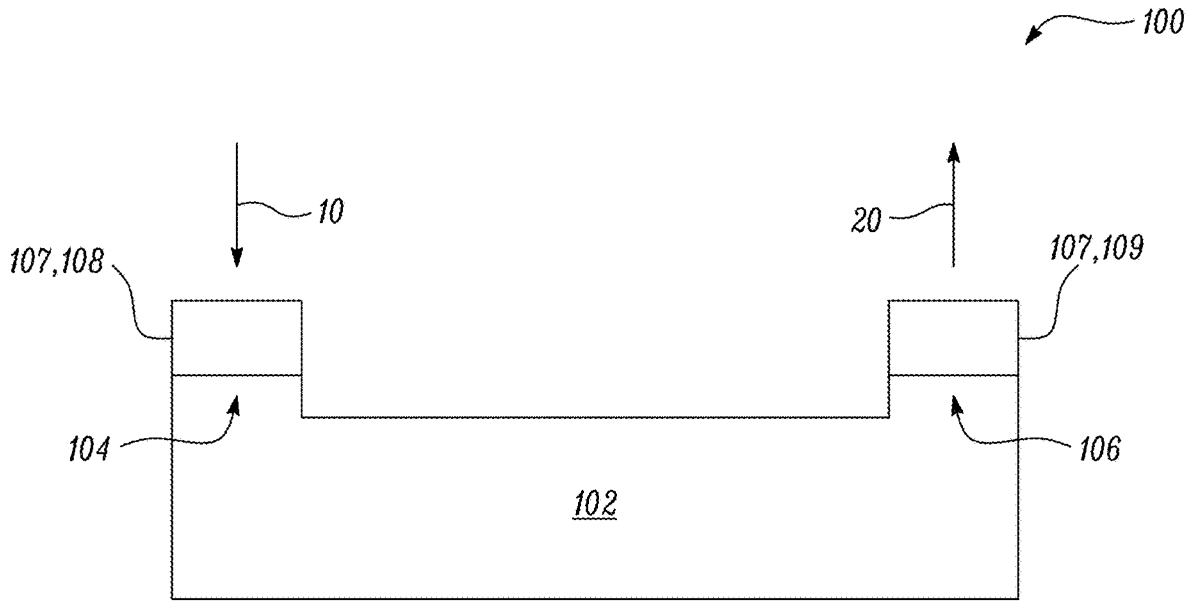
FIG. 1 is a schematic view of a gas turbine engine system, according to an example of the present disclosure.

Referring to FIG. 1, a schematic view of an exemplary gas turbine engine system 100 is illustrated, The gas turbine engine system 100 includes a gas turbine engine 102. The gas turbine engine 102 includes an engine inlet 104 and an engine exhaust 106. The gas turbine engine 102 may include conventionally known components (not shown herein), such as, one or more compressor rotor assemblies, one or more combustion chambers, and one or more turbine rotor assemblies, and the like.

The gas turbine engine system 100 also includes an air duct 107 coupled to the gas turbine engine 102. The air duct 107 may direct airflow into and/or to direct exhaust out of the gas turbine engine 102. For example, the air duct 107 may embody an air inlet duct 108 coupled to the gas turbine engine 102 proximal to the engine inlet 104 of the gas turbine engine 102. Specifically, the air inlet duct 108 is disposed at an upstream end of the engine inlet 104. During operation of the gas turbine engine 102, an airflow 10 enters the engine inlet 104 via the air inlet duct 108. The airflow 10 flows through the compressor rotor assemblies, the combustion chambers, and the turbine rotor assemblies within the gas turbine engine 102, and exits the gas turbine engine 102 via the engine exhaust 106 as exhaust gases 20. In another example, the air duct 107 may include an exhaust outlet duct 109 coupled to the gas turbine engine 102 proximal to the engine exhaust 106 of the gas turbine engine 102 and disposed at a downstream end of the engine exhaust 106. During operation of the gas turbine engine 102, the airflow 10 exits the gas turbine engine 102 via the engine exhaust 106 (as exhaust gases) and exits the gas turbine engine system 100 via the exhaust outlet duct 109.

Figure 2:
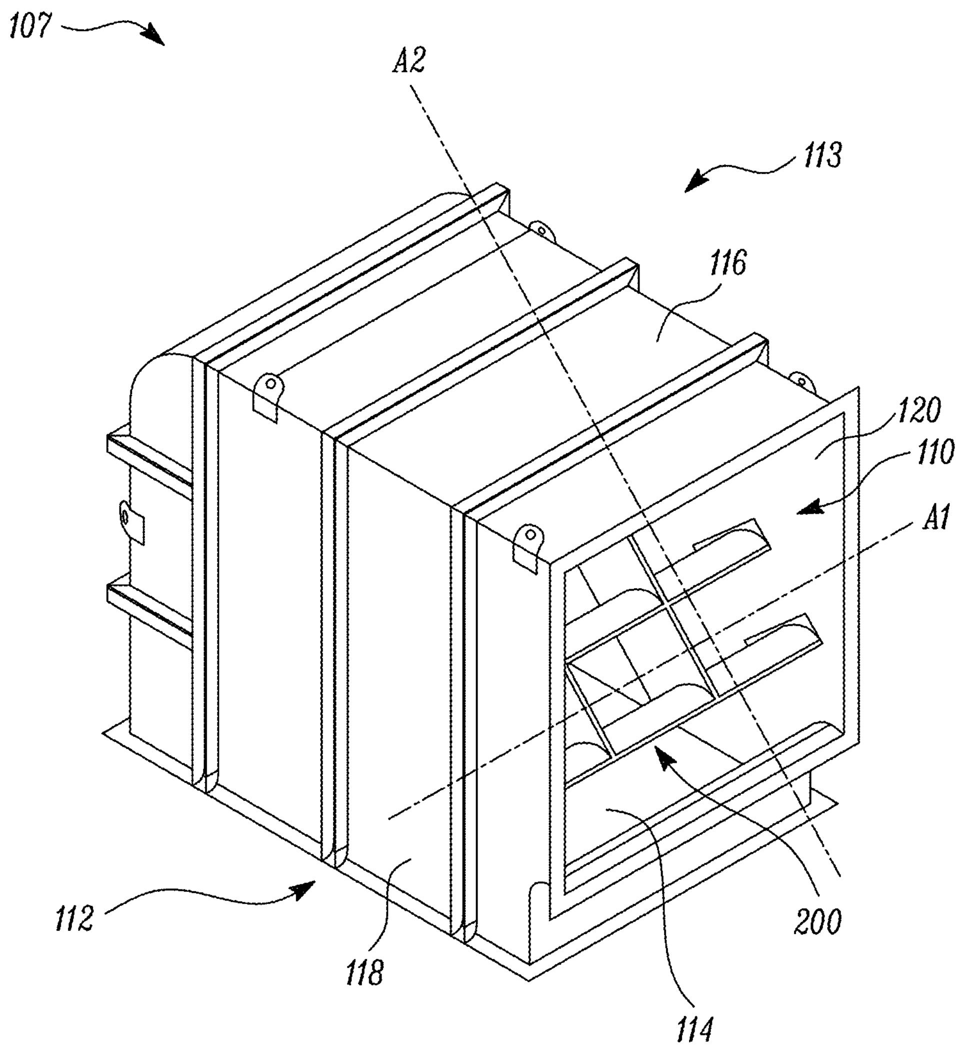
FIG. 2 is a schematic perspective view of a vane assembly disposed within an elbow section of an air duct of the gas turbine engine system of FIG. 1, according to an example of the present disclosure.

Referring to FIG. 2, the air duct 107 includes an elbow section 113, among other parts/components that are not shown. The elbow section 113, as described here, refers to a section of the air duct 107 that curves or turns, changing the direction of the airflow 10 (see FIG. 1) flowing therethrough. As illustrated in FIG. 2, in some examples, the elbow section 113 may turn 90 degrees. However, it is foreseen that the elbow section 113 may have any curve or design known in the art. As illustrated in FIG. 2, the elbow section 113 includes an inner wall 114, an outer wall 116, a first side wall 118, and a second side wall 120, defining an inlet 110 and an outlet 112. However, it is foreseen that the elbow section 113 may include any number of walls or may be a round air duct, defined by a single continuous wall.

The elbow section 113 may be located in any air duct associated with the gas turbine engine system 100, such as the air inlet duct 108 (see FIG. 1) or the exhaust outlet duct 109 (see FIG. 1). When the elbow section 113 is located in the air inlet duct 108, the outlet 112 of the elbow section 113 is in fluid communication with the engine inlet 104 (see FIG. 1) of the gas turbine engine 102 (see FIG. 1). The engine inlet 104 receives the airflow 10 from the outlet 112 of the air inlet duct 108.

When the elbow section 113 is located in the exhaust outlet duct 109, the inlet 110 of the elbow section 113 is in fluid communication with the engine exhaust 106 (see FIG. 1) of the gas turbine engine 102 (see FIG. 1). In such instances, the inlet 110 of the elbow section 113 receives the exhaust gases 20 (see FIG. 1) from the engine exhaust 106 and directs the exhaust gases 20 through the outlet 112 of the elbow section 113.

When the airflow 10 or the exhaust gases 20 pass through the elbow section 113, turbulence and pressure losses occur in the elbow section 113, which decreases an efficiency of the gas turbine engine 102. To reduce pressure losses, to increase the efficiency, and to ensure proper functioning of the gas turbine engine 102, the gas turbine engine system 100 includes a vane assembly 200 for directing the airflow 10 through the elbow section 113 of the air duct 107 associated with the gas turbine engine 102. The vane assembly 200 may be installed within the elbow section 113 to direct the airflow 10 or the exhaust gases 20 through the elbow section 113. Accordingly, the vane assembly 200 may be disposed in the air inlet duct 108 disposed upstream of the gas turbine engine 102 or the exhaust outlet duct 109 disposed upstream of the gas turbine engine 102.

As illustrated in FIG. 2, the vane assembly 200 extends along a longitudinal axis A1 and a transverse axis A2. The vane assembly 200 is coupled to the elbow section 113 such that the transverse axis A2 is oblique to the inner wall 114 of the elbow section 113. In other words, the vane assembly 200 may be coupled to the elbow section 113 at the first side wall 118 and the second side wall 120 and extends therebetween. The vane assembly 200 may be positioned within the elbow section 113, such that the transverse axis A2 of the vane assembly 200 extends between the inner wall 114 and the outer wall 116 of the elbow section 113. In some examples, the vane assembly 200 may be coupled to the elbow section 113 via one or more fastening means, such as, bolt, screws, rivets, pins, and the like. In other examples, the vane assembly 200 may be coupled to the elbow section 113 via welding, soldering, brazing, or any other joining technique, without any limitations.

Figure 3A:
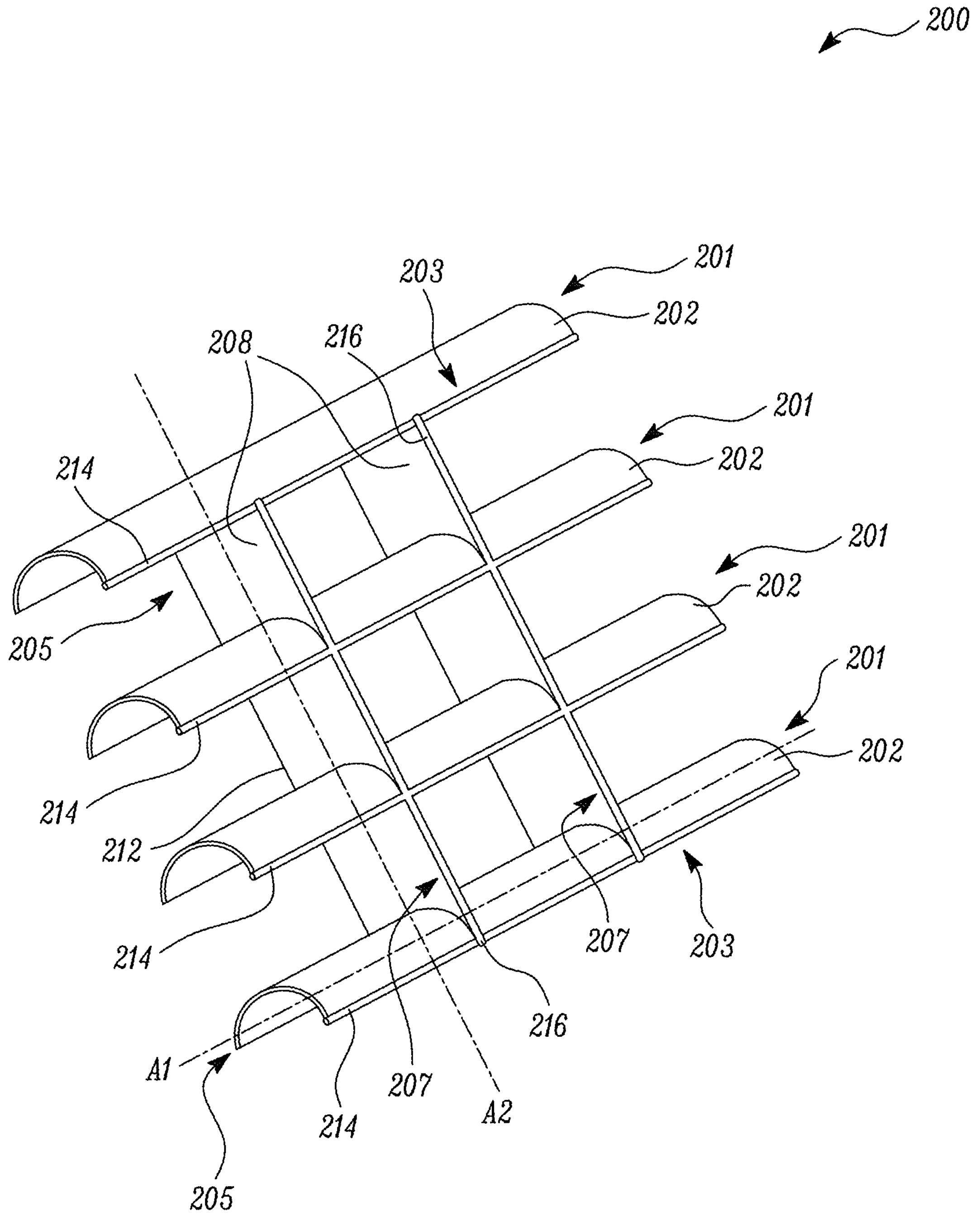
FIG. 3A is a schematic perspective view of the vane assembly that is disposed within the elbow section of the air duct of FIG. 2, according to an example of the present disclosure.
Figure 3B:
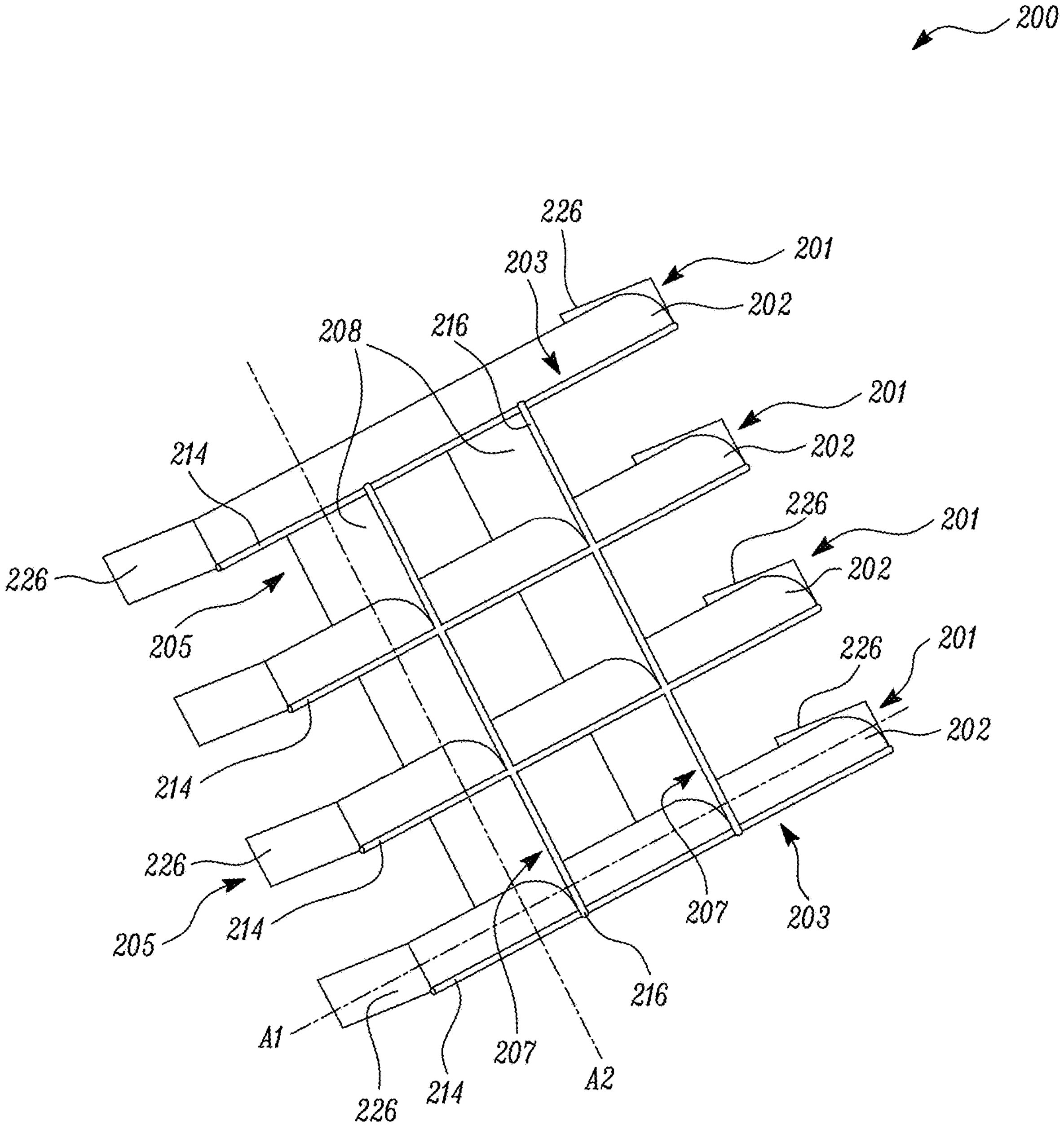
FIG. 3B is a schematic perspective view of the vane assembly of FIG. 3A, illustrating additional features, according to an example of the present disclosure.

Referring to FIGS. 3A and 3B, a schematic perspective view of the vane assembly 200 is illustrated. The vane assembly 200 includes a number of first vanes 201 extending along the longitudinal axis A1, and two or more second vanes 207 extending along the transverse axis A2, and intersecting the number of first vanes 201. The first vanes 201 are parallel to each of the other first vanes 201. Likewise, the second vanes 207 are parallel to each of the other second vanes 207.

In the illustrated embodiment of FIGS. 3A and 3B, the vane assembly 200 includes four rows of the first vanes 201 and two rows of the second vanes 207, intersecting the rows of the first vanes 201. The vane assembly 200 includes four first vanes 201 in total and two second vanes 207 in total. However, it should be noted that the vane assembly 200 may include any number of first vanes 201 and the second vanes 207, based on, for example, a size of the elbow section 113 (shown in FIG. 2).

The first vanes 201 may have a single-piece design or may include sub-plates that are separated from each other by an intersecting second vane 207. Likewise, the second vanes 207 may have a single-piece design or may include sub-plates that are separated from each other by an intersecting first vane 201. In one example, illustrated in FIGS. 3A and 3B, the first vanes 201 of the top and bottom rows of the vane assembly 200 have a single-piece design. Further, each first vane 201 of the middle rows includes three sub-plates that are separated from each other by the intersecting second vanes 207. It should be noted that the arrangement of the first and second vanes 201, 207 as illustrated herein is exemplary in nature. Any combination of single-piece vanes and sub-plates may be used to form the first and second vanes 201, 207.

The first vanes 201 may be coupled directly or indirectly to the elbow section 113. When the elbow section 113 has four walls, as depicted in FIG. 2, the first vanes 201 may be coupled directly or indirectly to the first side wall 118 and the second side wall 120 of the elbow section 113.

FIG. 2 shows the first vanes 201 (see FIG. 3A) as being coupled directly to the elbow section 113. In some examples, the first vanes 201 may be coupled directly to the elbow section 113 via one or more fastening means, such as, bolt, screws, rivets, pins, and the like. In other examples, the first vanes 201 may be coupled to the elbow section 113 via welding, soldering, brazing, or any other joining technique, without any limitations.

As shown in FIG. 3B, the vane assembly 200 may further include a number of coupling plates 226. The coupling plates 226 allow indirect coupling of the first vanes 201 of the vane assembly 200 with the elbow section 113 (see FIG. 2). Some of the first vanes 201 may be coupled with a corresponding coupling plate 226 via welding. In other examples, some of the first vanes 201 may be coupled with the corresponding coupling plate 226 via soldering, brazing, using mechanical fasteners, or any other technique known in the art. In some examples, the first vanes 201 and the corresponding coupling plates 226 may be manufactured as one-piece.

Figure 4:
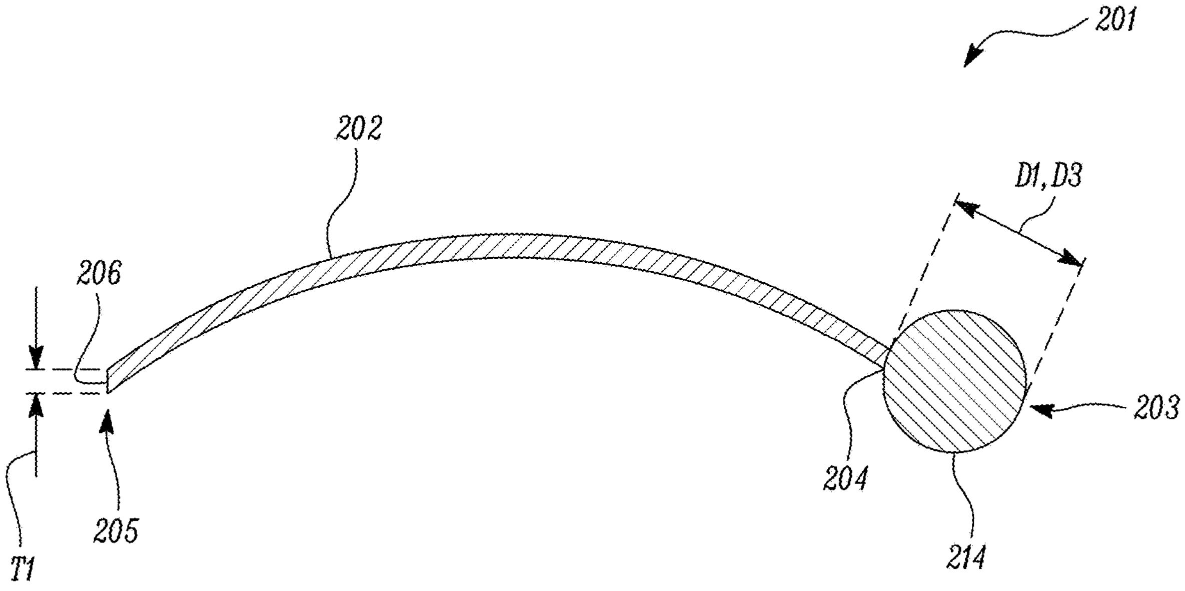
FIG. 4 is a schematic cross-sectional side view of a first plate and a first vibration inhibition device of a vane assembly, according to an example of the present disclosure.

Turning to FIG. 4, each first vane 201 includes a first plate 202 and a first vibration inhibition device 214. The first plate 202 is elongated, extending along the longitudinal axis A1 (as shown in FIGS. 3A and 3B), and has a curved profile. The first plate 202 defines an upstream end 204 and a downstream end 206, opposite the upstream end 204. In some examples, the first plate 202 may be made of sheet metal. In other examples the first plate 202 may be made of any other metal or an alloy. In some examples, high strength polymers or composites may also be used to form the first plate 202. The first plate 202 may be formed by casting, molding, forging, and the like. Further, the first plate 202 has a first thickness T1 along the transverse axis A2 (shown in FIGS. 3A and 3B) that is orthogonal to the longitudinal axis A1.

Further, the first vibration inhibition device 214 comprises a cylindrical rod herein. The upstream end 204 of the first plate 202 is coupled to the first vibration inhibition device 214. A total number of the first vibration inhibition devices 214 corresponds to a total number of the number of the first plates 202 associated with the vane assembly 200. In the illustrated example of FIGS. 3A and 3B, the vane assembly 200 includes four first vibration inhibition devices 214 corresponding to the total number of the first plates 202.

In an example, the upstream end 204 of the first plate 202 is coupled to the first vibration inhibition device 214 by welding. In other examples, the upstream end 204 of the first plate 202 may be coupled to the first vibration inhibition device 214 by soldering, brazing, one or more mechanical fasteners, or any other joining technique, without any limitations. In another example, the first vibration inhibition device 214 and a corresponding first plate 202 may be manufactured as one piece.

As shown in FIG. 4, the first vibration inhibition device 214 has a first dimension D1 along the transverse axis A2 (shown in FIGS. 3A and 3B). The first dimension D1 is greater than the first thickness T1 of the first plate 202. Particularly, the first dimension D1 includes a diameter D3 of the first vibration inhibition device 214. In some examples, a value of the first dimension D1 lies in range of 0.3 inches and 0.9 inches. In an example, the first dimension D1 may be approximately equal to 0.75 inches.

In some examples, the first vibration inhibition device 214 may be made of a metallic material and/or an alloy. In one example, the first vibration inhibition device 214 may be made of stainless steel. In some examples, high strength polymers or composites may also be used to form the first vibration inhibition device 214.

Figure 5:
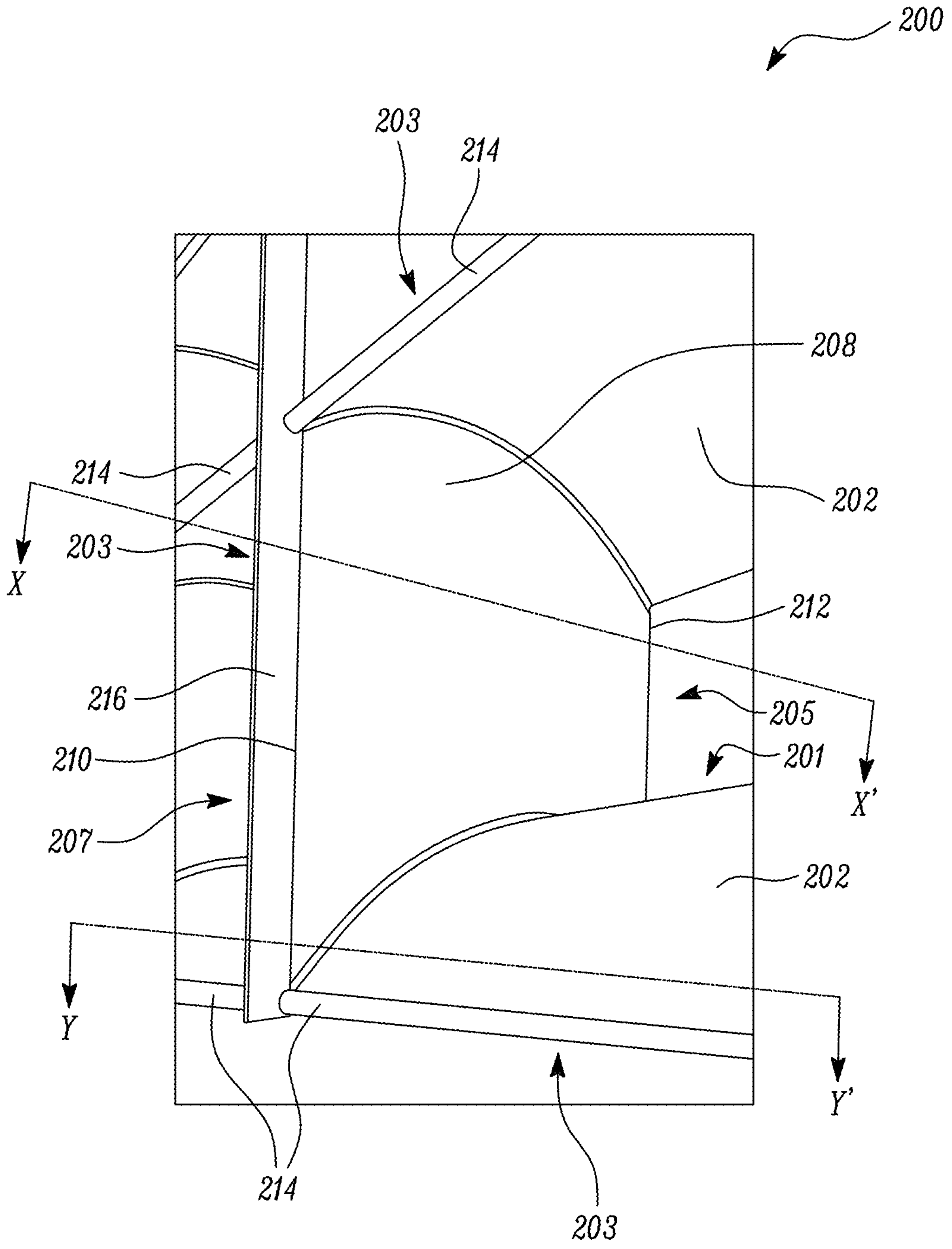
FIG. 5 is a schematic perspective view of a portion of a vane assembly, according to an example of the present disclosure.
Figure 6:
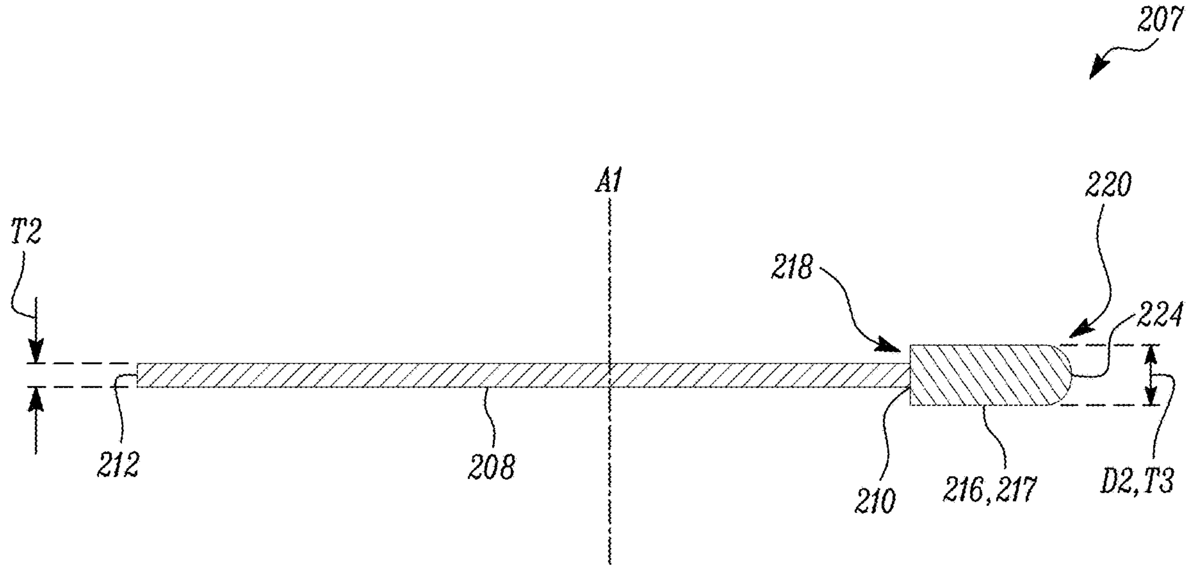
FIG. 6 is a schematic cross-sectional top view of a second plate and a second vibration inhibition device associated with the vane assembly of FIG. 5, taken along a plane X-X' shown in FIG. 5.
Figure 7:
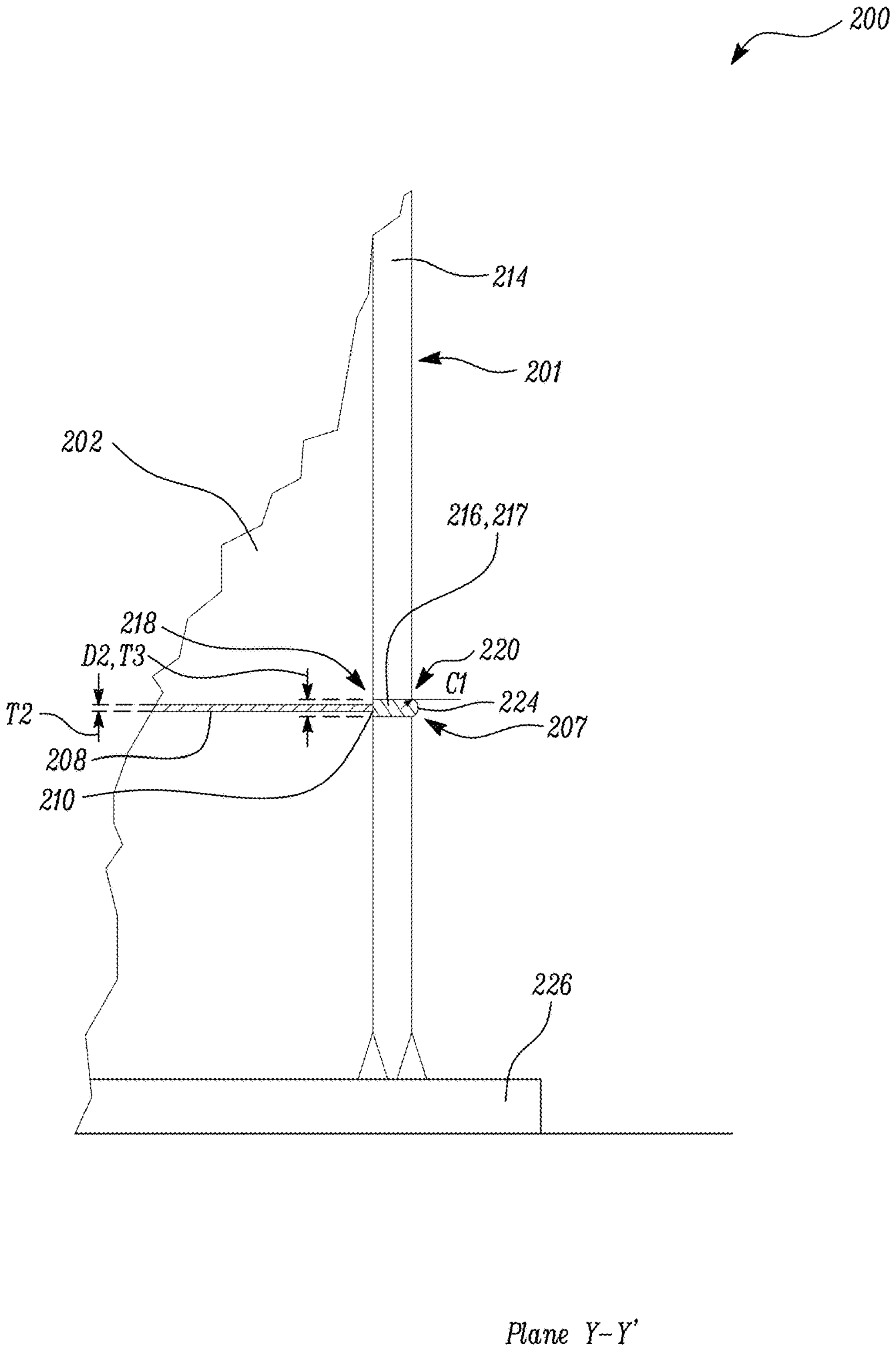
FIG. 7 is a schematic cross-sectional view of a portion of the vane assembly of FIG. 5, taken along a plane Y-Y' shown in FIG. 5.

FIG. 5 is a schematic perspective view of a portion of the vane assembly 200, according to an example of the present disclosure. FIG. 6 is a cross-sectional top view of the second vane 207, taken along a plane X-X' of FIG. 5. FIG. 7 illustrates a schematic cross-sectional view of a portion of the vane assembly 200 of FIG. 3 taken along a plane Y-Y' of FIG. 5.

Referring to FIGS. 5-7, each of the two second vanes 207 includes a second plate 208 and a second vibration inhibition device 216. The second plate 208 is elongated, extending along the transverse axis A2 (as shown in FIGS. 3A and 3B), and has a flat profile. The second plate 208 defines an upstream end 210 and a downstream end 212, opposite the upstream end 210. In some examples, the second plate 208 may be made of sheet metal. In other examples the second plate 208 may be made of any other metal or an alloy. In some examples, high strength polymers or composites may also be used to form the second plate 208. The second plate 208 may be formed by casting, molding, forging, and the like. The second plate 208 has a second thickness T2 along the longitudinal axis A1.

Further, the upstream end 210 of the second plate 208 is coupled to the second vibration inhibition device 216. In some examples, the second vibration inhibition device 216 may be made of a metallic material and/or an alloy. In one example, the second vibration inhibition device 216 may be made of stainless steel. In some examples, high strength polymers or composites may also be used to form the second vibration inhibition device 216.

The second vibration inhibition device 216 may comprise a plate 217. A total number of the plates 217 corresponds to a total number of the number of second plates 208. Specifically, the vane assembly 200 includes two plates 217 corresponding to the two second plates 208. The plate 217 has a first end 218 coupled to the upstream end 210 of the second plate 208 and a second end 220 opposite to the first end 218. The plate 217 includes a curved surface 224 at the second end 220. The curved surface 224 defines a radius of curvature C1. In some examples, the radius of curvature C1 of the curved surface 224 lies in a range of 0.1 inches to 0.2 inches. In an example, the radius of curvature C1 may be approximately equal to 0.18 inches.

The second vibration inhibition device 216 has a second dimension D2 along the longitudinal axis A1. The second dimension D2 is greater than the second thickness T2 of the second plate 208. Specifically, the second dimension D2 of the second vibration inhibition device 216 includes a thickness T3 of the plate 217. The thickness T3 is greater than the second thickness T2 of the second plate 208. In some examples, a value of the second dimension D2 lies in range of 0.3 inches and 0.9 inches. In an example, the second dimension D2 i.e., the thickness T3 may be approximately equal to 0.75 inches. In some examples, the plate 217 may include a flat surface at the first end 218. In other examples, the plate 217 may include a curved surface, similar to the curved surface 224, at the first end 218.

In an example, the upstream end 210 of the second plate 208 is coupled to the second vibration inhibition device 216 by welding. In other examples, the upstream end 210 of the second plate 208 is coupled to the second vibration inhibition device 216 by soldering, brazing, one or more mechanical fasteners, or any other joining technique, without any limitations. In another example, the plate 217 and the second plate 208 may be manufactured as one piece.

Figure 8:
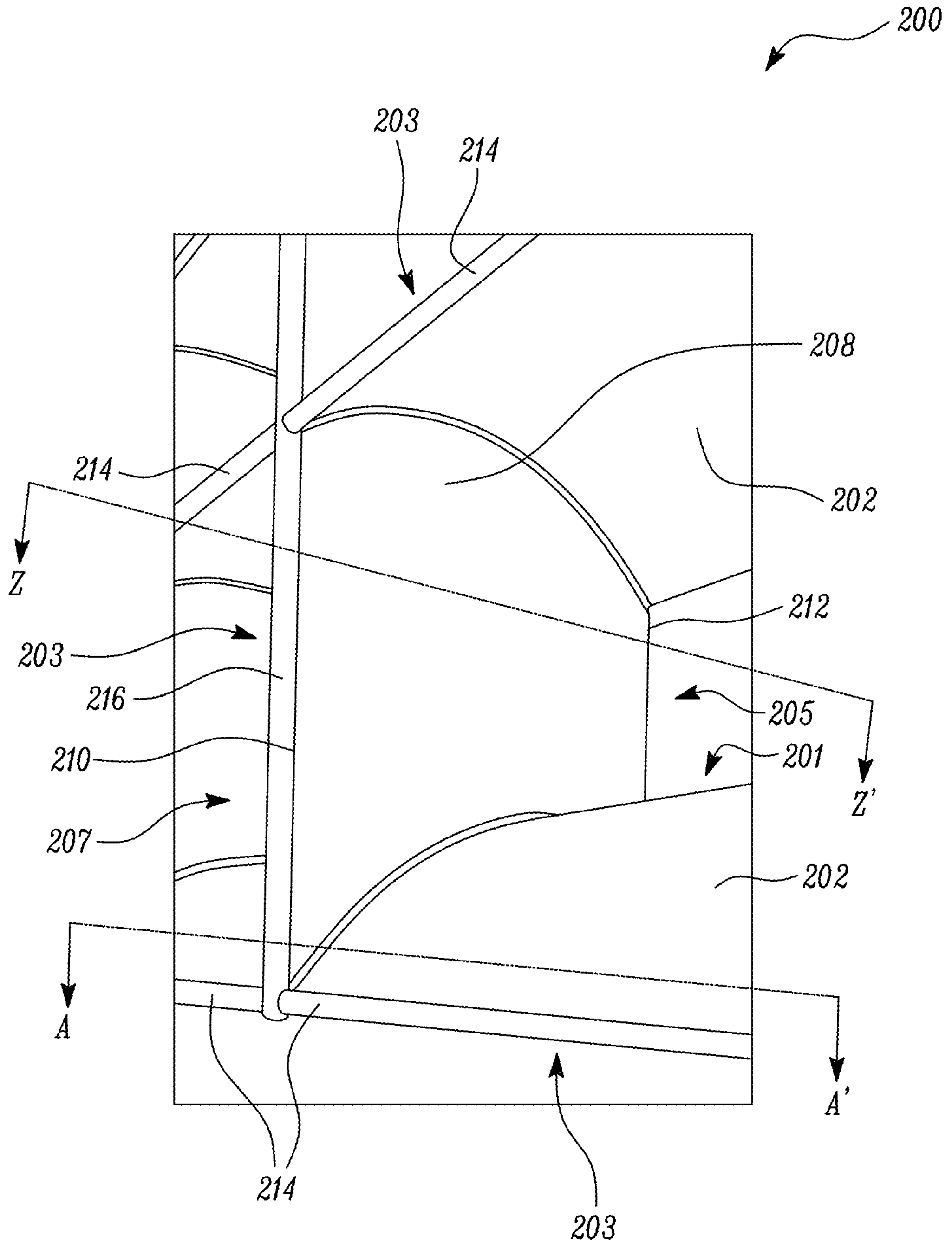
FIG. 8 is a schematic cross-sectional view of a portion of a vane assembly, according to another example of the present disclosure.
Figure 9:
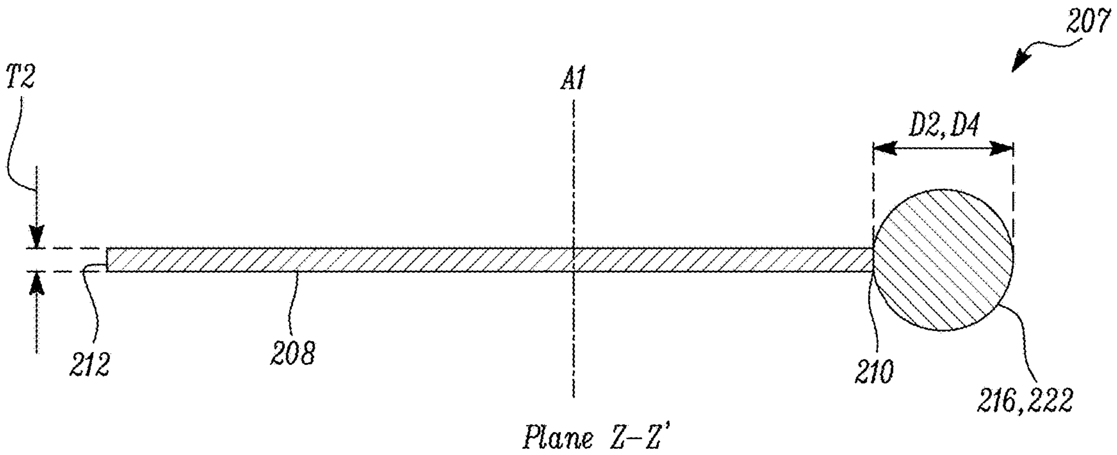
FIG. 9 is a schematic cross-sectional side view of a second plate and a second vibration inhibition device associated with the vane assembly of FIG. 8, taken along a plane Z-Z' shown in FIG. 8.
Figure 10:
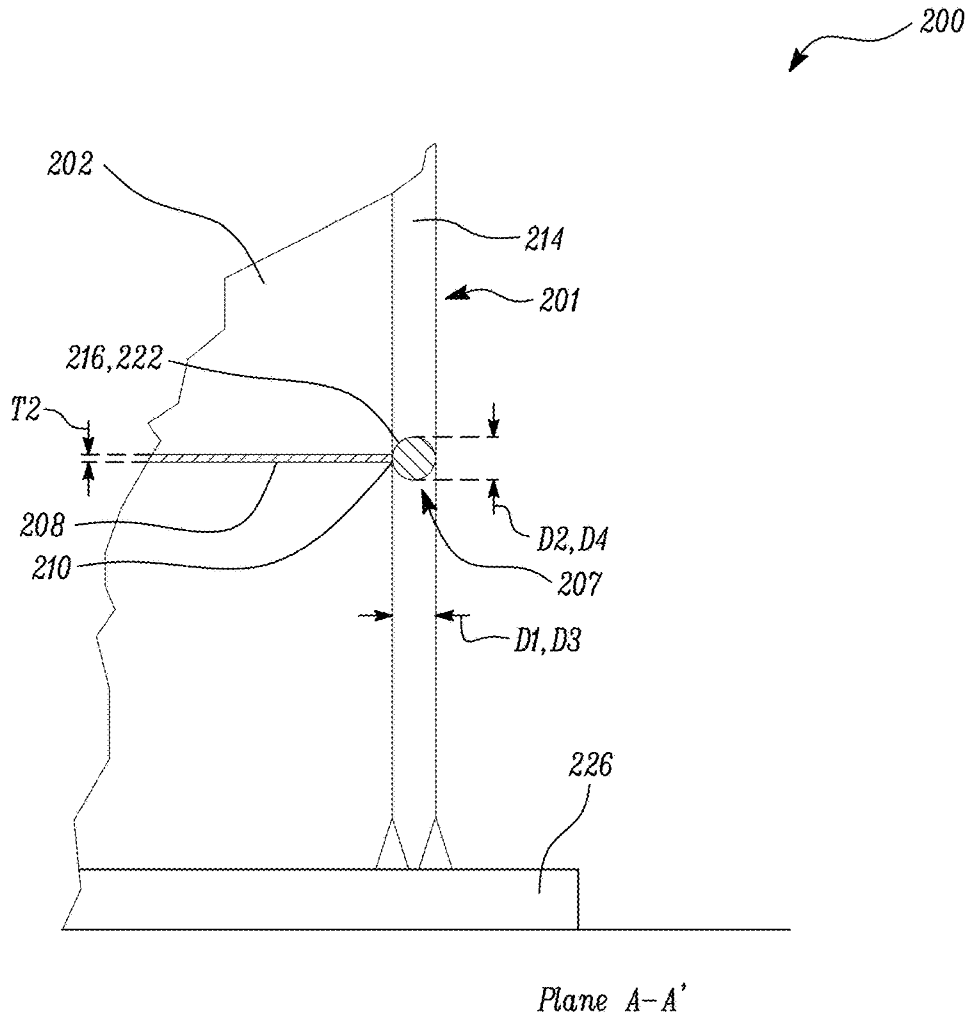
FIG. 10 is a schematic cross-sectional view of a portion of the vane assembly of FIG. 8, taken along a plane A-A' shown in FIG. 8.

FIG. 8 is a schematic perspective view of a portion of the vane assembly 200, wherein the second vane 207 is illustrated. FIG. 9 is a cross-sectional top view of the second vane 207, taken along a plane Z-Z' of FIG. 8. FIG. 10 illustrates a schematic cross-sectional view of a portion of the vane assembly 200 of FIG. 8 taken along a plane A-A' of FIG. 8.

Referring to FIGS. 8-10, in some examples, the second vibration inhibition device 216 may comprise a cylindrical rod 222. The cylindrical rod 222 may be coupled to the upstream end 210 of the second plate 208. The cylindrical rod 222 defines a diameter D4. Accordingly, the second dimension D2 of the second vibration inhibition device 216 includes the diameter D4. Further, a total number of the cylindrical rod 222 corresponds to the total number of second plates 208. Specifically, the vane assembly 200 includes two cylindrical rods 222 corresponding to the two second plates 208.

In some examples, a shape and dimensions of the first vibration inhibition device 214 may correspond to a shape and dimensions of the second vibration inhibition device 216. Specifically, in the examples illustrated on FIGS. 8-10, the shape and dimensions of the first vibration inhibition device 214 corresponds to the shape and dimensions of the second vibration inhibition device 216. However, in other examples, the first vibration inhibition device 214 and the second vibration inhibition device 216 may have different shape and/or dimensions.

Referring again to FIGS. 3A-3B, the first vibration inhibition devices 214 and the second vibration inhibition devices 216 define a leading edge 203 of the vane assembly 200. Further, the downstream end 206 (shown in FIG. 4) of the first plates 202 and the downstream end 212 (shown in FIG. 6) of the second plates 208 define a trailing edge 205 of the vane assembly 200.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure describes the vane assembly 200 for directing the airflow 10 through the elbow section 113 of the air duct 107 associated with the gas turbine engine 102. The vane assembly 200 includes the first vibration inhibition devices 214 and the second vibration inhibition devices 216. The upstream end 204 of each first plate 202 is coupled to the first vibration inhibition device 214. Further, the upstream end 210 of each second plate 208 is coupled to the second vibration inhibition device 216.

In an example, each of the number of first vibration inhibition devices 214 and the second vibration inhibition devices 216 includes the cylindrical rod 222. In another example, the second vibration inhibition devices 216 includes the plate 217 having the curved surface 224. The first and second vibration inhibition devices 214, 216 may generate a symmetric airflow profile across the first and second vibration inhibition devices 214, 216 in a wake flow zone that is defined along the first and second vanes 201, 207. The wake flow zone may be a zone of disturbed airflow (for example, a turbulent airflow) downstream of the first and second vibration inhibition devices 214, 216.

The first and second vibration inhibition devices 214, 216 make the vane assembly 200 more aerodynamic by allowing air to flow around the vane assembly 200 with less turbulence and to reduce pressure drop at a bend of the air duct 107. Such an aerodynamic vane assembly 200 may reduce vibrations experienced by the vane assembly 200. Further, the first and second vibration inhibition devices 214, 216 may improve a natural frequency of the vane assembly 200 and may also reduce a magnitude of flow excitation force on the vane assembly 200. Thus, the first and second vibration inhibition devices 214, 216 may inhibit flow induced vibration excitation forces and may improve a structural integrity of the vane assembly 200. Moreover, the first and second vibration inhibition devices 214, 216 may allow the vane assembly 200 to be operated beyond a fatigue endurance limit and may also allow operation of the vane assembly 200 for a longer time without any failures. The first and second vibration inhibition devices 214, 216 may also prevent disintegration of the first vanes 201 and the second vanes 207, thereby reducing a probability of entry of broken pieces, such as, metal chips into the gas turbine engine 102.

The first and second vibration inhibition devices 214, 216 may improve a performance, durability, and reliability of the vane assembly 200. Further, the first and second vibration inhibition devices 214, 216 have a simple design, thus the first and second vibration inhibition devices 214, 216 may be easy to assemble with the first and second vanes 201, 207 and may require less time for assembling/manufacturing. Further, the first and second vibration inhibition devices 214, 216 may reduce servicing and maintenance costs associated with the gas turbine engine system 100 by reducing a probability of failure of the first and second vanes 201, 207. Moreover, the vane assembly 200 described herein may be cost-effective and may be retrofitted in existing gas turbine engine systems.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A vane assembly for directing airflow through an elbow section of an air duct associated with a gas turbine engine, the vane assembly comprising:

a plurality of first vanes extending along a longitudinal axis, wherein each of the plurality of first vanes includes:

a first plate defining a first upstream end and a first downstream end, opposite the first upstream end, wherein the first plate has a first thickness along a transverse axis that is orthogonal to the longitudinal axis; and a first vibration inhibition device, wherein the first upstream end of the first plate is coupled to the first vibration inhibition device, wherein the first vibration inhibition device has a first dimension along the transverse axis, and wherein the first dimension is greater than the first thickness of the first plate; and at least two second vanes extending along the transverse axis, and intersecting the plurality of first vanes, wherein each of the at least two second vanes includes:

a second plate defining a second upstream end and a second downstream end, opposite the second upstream end, wherein the second plate has a second thickness along the longitudinal axis; and a second vibration inhibition device, wherein the second upstream end of the second plate is coupled to the second vibration inhibition device, wherein the second vibration inhibition device has a second dimension along the longitudinal axis, and wherein the second dimension is greater than the second thickness of the second plate, wherein at least one of the first vibration inhibition device or the second vibration inhibition device includes a cylindrical rod, and wherein at least one of the first dimension of the first vibration inhibition device or the second dimension of the second vibration inhibition device includes a diameter.

2. The vane assembly of claim 1, wherein the first vibration inhibition device includes the cylindrical rod, and wherein the first dimension of the first vibration inhibition device includes the diameter.

3. The vane assembly of claim 1, wherein the second vibration inhibition device includes the cylindrical rod, and wherein the second dimension of the second vibration inhibition device includes the diameter.

4. The vane assembly of claim 1, wherein the second vibration inhibition device includes a plate, the plate has a first end coupled to the second upstream end of the second plate and a second end opposite to the first end, wherein the plate includes a curved surface at the second end, and wherein the second dimension of the second vibration inhibition device includes a thickness of the plate.

5. The vane assembly of claim 4, wherein the curved surface defines a radius of curvature, and wherein the radius of curvature of the curved surface lies in a range of 0.1 inches to 0.2 inches.

6. The vane assembly of claim 1, wherein each of the first vibration inhibition device and the second vibration inhibition device is made of at least one of a metallic material and an alloy.

7. The vane assembly of claim 1, wherein each of the first vibration inhibition device and the second vibration inhibition device is made of stainless steel.

8. The vane assembly of claim 1, wherein the first upstream end of the first plate is coupled to the first vibration inhibition device by welding.

9. The vane assembly of claim 1, wherein the second upstream end of the second plate is coupled to the second vibration inhibition device by welding.

10. The vane assembly of claim 1, wherein a value of each of the first dimension of the first vibration inhibition device and the second dimension of the second vibration inhibition device lies in a range of 0.3 inches and 0.9 inches.

11. The vane assembly of claim 1, wherein a shape and dimensions of the first vibration inhibition device correspond to a shape and dimensions of the second vibration inhibition device.

12. The vane assembly of claim 1, wherein the vane assembly is disposed in at least one of an air inlet duct disposed upstream of the gas turbine engine or an exhaust outlet duct disposed downstream of the gas turbine engine.

13. A gas turbine engine system comprising:

a gas turbine engine including an engine inlet and an engine exhaust;

an air duct coupled to the gas turbine engine, the air duct including an elbow section; and a vane assembly disposed within the elbow section of the air duct for directing airflow through the elbow section, the vane assembly including:

a plurality of first vanes extending along a longitudinal axis, wherein each of the plurality of first vanes includes:

a first plate defining a first upstream end and a first downstream end, opposite the first upstream end, wherein the first plate has a first thickness along a transverse axis that is orthogonal to the longitudinal axis; and a first vibration inhibition device, wherein the first upstream end of the first plate is coupled to the first vibration inhibition device, wherein of the first vibration inhibition device has a first dimension along the transverse axis, and wherein the first dimension is greater than the first thickness of the first plate; and at least two second vanes extending along the transverse axis, and intersecting the plurality of first vanes, wherein each of the at least two second vanes includes:

a second plate defining a second upstream end and a second downstream end, opposite the second upstream end, wherein the second plate has a second thickness along the longitudinal axis; and a second vibration inhibition device, wherein the second upstream end of the second plate is coupled to the second vibration inhibition device, wherein the second vibration inhibition device has a second dimension along the longitudinal axis, and wherein the second dimension is greater than the second thickness of the second plate, wherein at least one of the first vibration inhibition device or the second vibration inhibition device includes a cylindrical rod, and wherein at least one of the first dimension of the first vibration inhibition device or the second dimension of the second vibration inhibition device includes a diameter.

14. The gas turbine engine system of claim 13, wherein the first vibration inhibition device includes the cylindrical rod, and wherein the first dimension of the first vibration inhibition device includes the diameter.

15. The gas turbine engine system of claim 13, wherein the second vibration inhibition device includes the cylindrical rod, and wherein the second dimension of the second vibration inhibition device includes the diameter.

16. The gas turbine engine system of claim 13, wherein the second vibration inhibition device includes a plate, the plate has a first end coupled to the second upstream end of the second plate and a second end opposite to the first end, wherein the plate includes a curved surface at the second end, and wherein the second dimension of the second vibration inhibition device includes a thickness of the plate.

17. The gas turbine engine system of claim 16, wherein each of the first vibration inhibition device and the second vibration inhibition device is made of stainless steel.

18. The gas turbine engine system of claim 13, wherein each of the first vibration inhibition device and the second vibration inhibition device is made of at least one of a metallic material and an alloy.

19. The gas turbine engine system of claim 13, wherein each of the first vibration inhibition device and the second vibration inhibition device is made of stainless steel.

20. The gas turbine engine system of claim 13, wherein a value of each of the first dimension of the first vibration inhibition device and the second dimension of the second vibration inhibition device lies in a range of 0.3 inches and 0.9 inches.

* * * * *